(12) United States Patent
Aharon

(10) Patent No.: US 12,248,148 B2
(45) Date of Patent: Mar. 11, 2025

(54) SMART EYEGLASSES

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 619 days.

(21) Appl. No.: 17/499,880

(22) Filed: Oct. 13, 2021

(65) Prior Publication Data

US 2023/0115411 A1    Apr. 13, 2023

(51) Int. Cl.
*G02B 27/01* (2006.01)
*G02C 11/00* (2006.01)

(52) U.S. Cl.
CPC ............ *G02B 27/017* (2013.01); *G02C 11/10* (2013.01); *G02B 2027/0138* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

2017/0168566 A1* 6/2017 Osterhout ............ G02B 27/017
2024/0012245 A1* 1/2024 Adema .............. G02B 27/0176

* cited by examiner

*Primary Examiner* — Bao-Luan Q Le
*Assistant Examiner* — Danell L Owens

(57) ABSTRACT

New spectacle related technology is offered for Augmented and Virtual Reality. However, this technology has many drawbacks and is not taking full advantage for other applications, for example driver glasses with enhanced imaging possibilities. Our embodiment offers 3D scanning cameras device built in to a pair of glasses to offer enhanced imaging, preferable for night driving. Special embodiment will offer the scanning device wherein an attachment will facilitate the device to be mounted to the glasses. The glasses themselves may have some other features for offering augmented and virtual reality to better serve the wearer on day-to-day life.

6 Claims, 5 Drawing Sheets

SMART EYEGLASSES

BACKGROUND OF THE INVENTION

1. Field of Invention

The disclosed art relates to wearable glasses with augmented features such as built in 3D scanning vision, which may or may not follow the instantaneous line of sight of wearer's eyes.

2. Description of the Related Art 3D perception of environment is primarily achieved by the human eyes due to the fact that there's a separation in between, followed by synchronized parallel gazing direction for both eyes. Although there are multiple types of AR technologies incorporated into spectacle, allowing optical superposition between the surroundings and projected information, there is still a need for a system capable of presenting optical information from the physical world using two separated imaging devices which work in parallel similarly to the eyes' activity. Presenting this information to the wearer's eyes will create a 3D digital image superimposed on the physical world. Using this concept, 3D reconstruction of the image is performed by the wearer mind without the need for computer calculation and wide bandwidth communication.

Such a device will potentially revolutionize many fields, including enhanced imaging for driving, medical intensive security and other sight related applications. By the way of example, the driving wearer could use superior camera devices similar to the ones used in mobile phones to get more sensitive night vision and better observation of distant objects. Using FLIR type of cameras has the potential to grant total night vision capability to wearer. Moreover, because of the limited performance of low AR displays, using two of them synchronized with said camera has the potential to provide enough information, even with low-cost devices. Naturally, at any time, if the wearer chooses so, he can turn off each of projected images.

For example, Google Glass® has a narrow field of view with an image resolution of 640×360 pixels. Being a mono display type, it has a limited ability for real world applications, but displaying with dual screen for both eyes will have a significantly increased quality with relatively low cost. Implementing the technology disclosed in the patent US20200092487A1, a device with two scanning cameras will be incorporated into a spectacle frame as followed by detailed description of proposed art.

SUMMARY

The disclosed invention relates to glasses with built in 3D scanning camera and display means to the wearer. Several embodiments of the invention are disclosed revealing different aspects and usage.

For example, the optical design of one of the aspects of this present invention may include the pair of objective lenses disposed at the corners of a glass frame, a motorized device capable of moving two miniature cameras across the image field of said lens, a mechanical part connecting the miniature camera to the motorized frame. The optical image projection is unique and is capable of projecting two images as created by the two cameras into the wearer's pupils, creating an augmented reality as seen by said cameras. In one exemplary configuration of present art, the display optics will present the image of left camera to the left eye, and the image of the right camera to the right eye, and the user's mind will automatically create a 3D image of said device, superimposed to the real image as seen through the spectacle glasses. The display optics are based on two eyepieces preferable connected to temples of glasses and have a similar construction to electronic camera viewfinder. Eye tracking direction means will be incorporated to follow pupil lines of sights and control the cameras' lines of sight to coincide with the wearer's pupils. Moreover, a microcontroller streamed with said images can perform calculation and data display regarding distances streamed and information that the wearer may need. For special applications, and enhanced night vision in total darkness, said cameras could be made to be FLIR cameras.

In another embodiment of the invention, the wearer frame could be standard and a special attachment including the above-described elements will be externally fitted by clips to attach to existing frame.

To summarize, the apparatus comprises a pair of eyeglasses for the wearer, having two lenses on its frame corners and two cameras mounted on said lens image plane, solidly connected in between and a motor for scanning the cameras on lenses' image plane and functionally controlled and activated by gesture recognition or by remote wireless control. Connection is performed through electronic interface to a mobile phone or similar devices, to store data and activate it. Yet another embodiment is disclosed, wherein a pair of eyeglasses with slanted lenses configured to receive image and other radiations from a microdisplay eyepiece unit, mounted on the temples and deflecting towards the eyes' central line of sight. Image is projected by a microdisplay eyepiece, wherein said microdisplay eyepiece unit includes a microdisplay, a beam splitter and an illuminating IR source. Said microdisplay unit is configured to radiate the microdisplay image and illumination from LED, and back reflection from wearer's eye is imaged by optical objective of said microdisplay to a camera disposed on the image plane, where the wearer's eye image reflection is created. Moreover, images projected to wearer's eyes are digital images and fed from a computer or a mobile phone. Furthermore, the apparatus has a pair of eyeglasses for the wearer, having two lenses on its frame corners and two cameras mounted on said lens image plane, and slanted lenses configurated to receive images and other radiations from a microdisplay eyepiece unit, mounted on the temples and deflecting towards the eyes' central line of sight. Said microdisplay unit can be mounted on a motorized axis to follow the wearer's gazing direction. Reflection by said slanted lenses are wire grid polarizers reflecting S or P polarization and eyepiece radiation is polarized to be reflected by lenses.

Furthermore, the apparatus is comprised from a spectacle frame with inward-slanting eyeglasses towards the nose bridge, configured to receive image and other radiations from a microdisplay eyepiece unit mounted on the temples, and reflecting from said lenses towards the wearer's eyes' central line of sight. Said microdisplay unit includes a microdisplay, a beamsplitter and an illuminating IR source configured to emit the microdisplay image and illumination from an LED, back reflection from the wearer's eye is captured by an optical objective of said microdisplay, creating the wearer's eye image reflection. Said digital image is to be projected to wearer's eyes and are fed from a computer or mobile phone. A processing device processes the reflected image into said eyepiece and calculates the direction of the wearer's gaze. Moreover, the spectacle frame has two lenses in its corner and two cameras mounted on said lens image plane. A pair of slanted lenses are configured to receive images from a microdisplay unit, mounted on the temples and deflecting towards the eyes' central line of sight, said microdisplay unit is capable of being mounted on a motorized axis to track the wearer's gazing direction. Said slanted lenses are wire grid polarizers reflecting S or P polarization and eyepiece radiation is polarized to be reflected by the lenses.

The invention can be implemented in numerous ways, including as a system, device, apparatus, and method. Several embodiments of the invention are discussed below. Various aspects and advantages of the present invention will become apparent from the following descriptions and drawings.

BRIEF DESCRIPTION OF THE DRAWINGS

For clarification, the various described embodiments are illustrated below. These figures are not drawn to scale and schematically describe the invention, but do not limit its applications.

DETAILED DESCRIPTION OF THE DRAWINGS

Current technologies for smart eyeglasses and AR/VR display usually have a relatively high discomfort since the line of sight of wearer is usually interfered with an optical device and some electronic displays in front of glass lenses. Another critical concern when applying functionality requirements to smart eyeglasses, is that they usually lack the capability of 3D imaging of surrounding and 3D image scanning.

Moreover, applications such as vision enhancement are rare. In today's technologies, camera systems are much more sensitive to light than human vision, so potentially our system will display intensified imaging in real time and in 3D. Applications such as driving, sports, 3D recording are key to wider acceptance of such technologies, complimenting the well-known mobile communication and AR/VR offered today. To fulfill the need of enhanced imaging technology which is accessible to wearer, an eye tracker device will compute the wearer's gazing direction, the scanning 3D camera will follow this direction and projected images in accordance with the direction will be displayed to wearer. In dynamic vision enhancement, the projected image will be displayed on a different angle.

Figure 1:
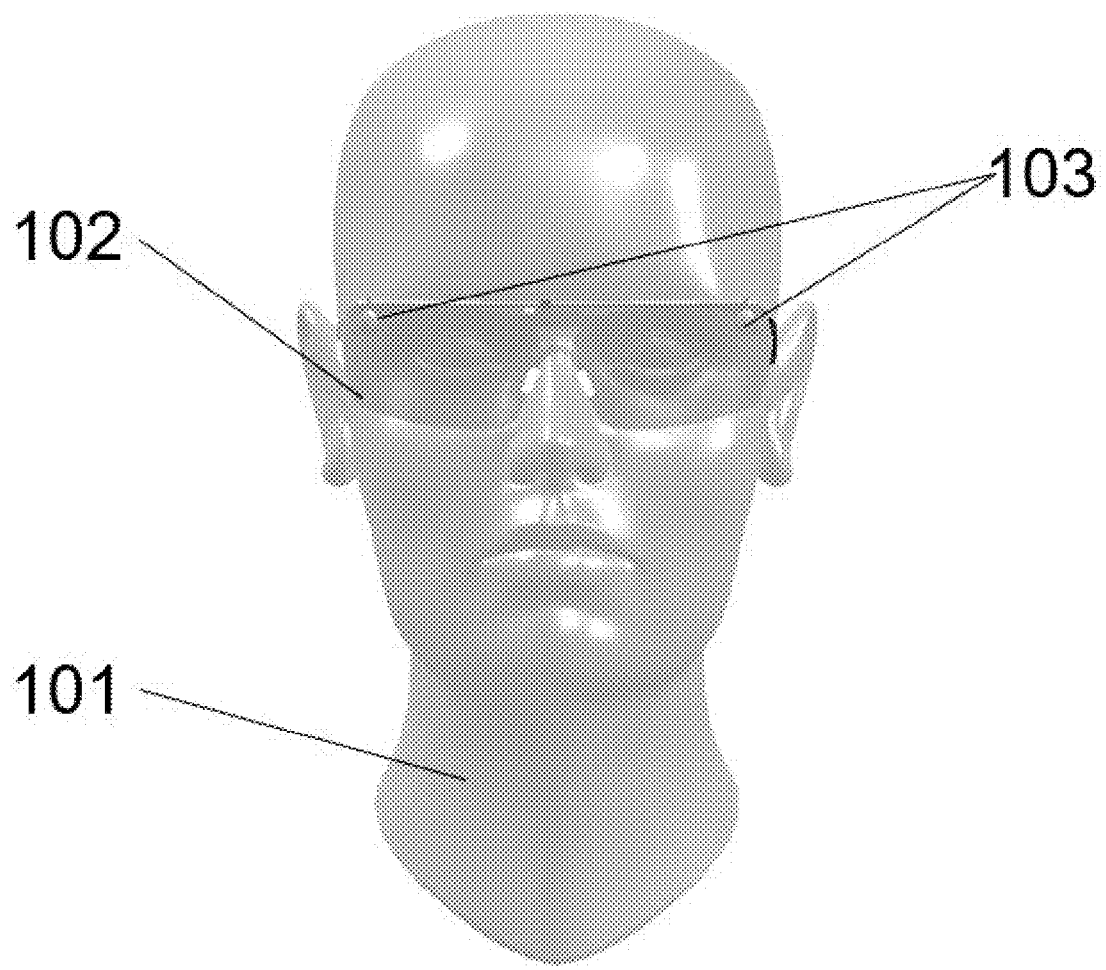
FIG. 1 is a view of the smart eyeglasses on the wearer's head.

FIG. 1 shows smart eyeglasses demonstrating their integration with the wearer, and they may constantly record in 3D including environmental scanning according to wearer's input. Wearer's head is denoted as 101, eyeglasses are denoted as 102, and the two lenses of cameras, which are located at the two sides of wearer's head are denoted as 103.

Figure 2:
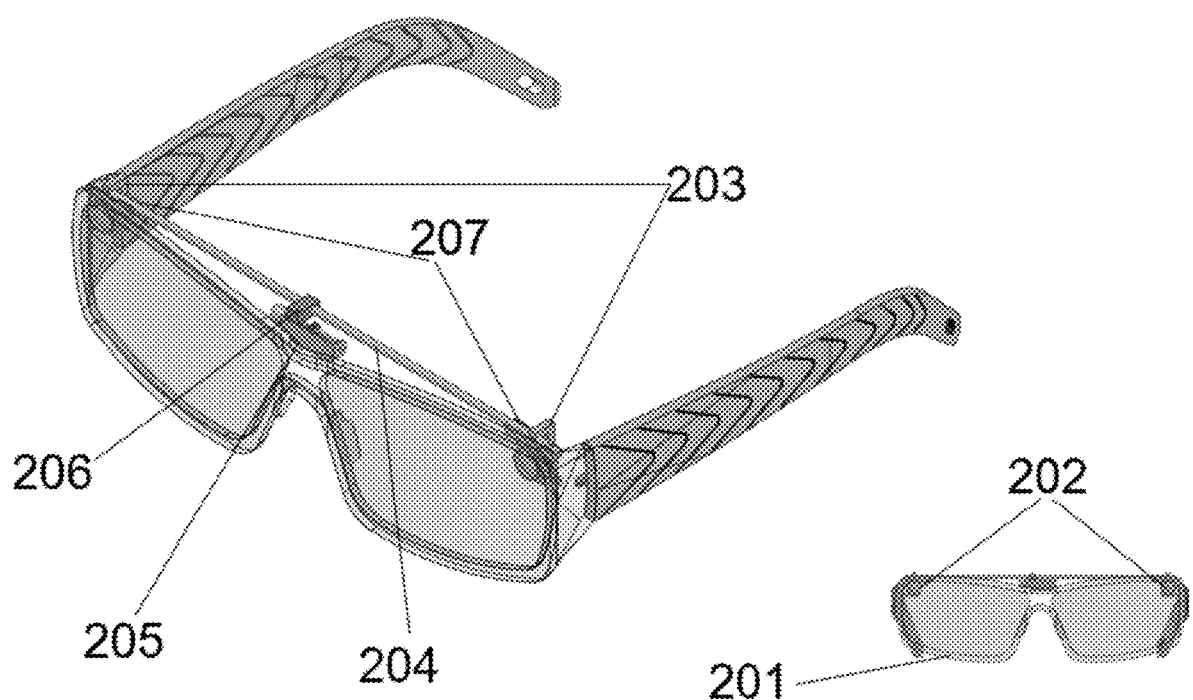
FIG. 2 is a view, including a perspective view of smart eyeglasses, including the 3D scanning mechanism and the two installed cameras.

FIG. 2 shows an embodiment wherein the 3D scanning cameras are mounted on the upper side of wearer's frame, allowing recording a 3D event including continuous scanning on a horizontal direction, and sending imaging information onto an electronic device or smartphone via standard electronic connection. The wearer's eyeglass frame is denoted as 201. The objective cameras mounted on the two far corners of frame are denoted as 202. Two sliding cameras 203 are connected to a sliding shaft denoted as 204. A motor denoted as 205 can move a sliding shaft left and right to scan the imaging plane of said lenses. The linear motor is connected to the sliding shaft by a member denoted as 206. The scanned image plane will record images each at a different angle relative to wearer's frame, and since two images at the same direction with a distance separation in between are generated, a 3D image could be created by software algorithms or later on be displayed to wearer's eyes on a mobile phone with a split image on its display. To retrieve a 3D conception, 3D virtual reality glasses headset could be used. Said sliding shaft is sliding relative to the frame in pre-prepared slots denoted as 207.

Figure 3:
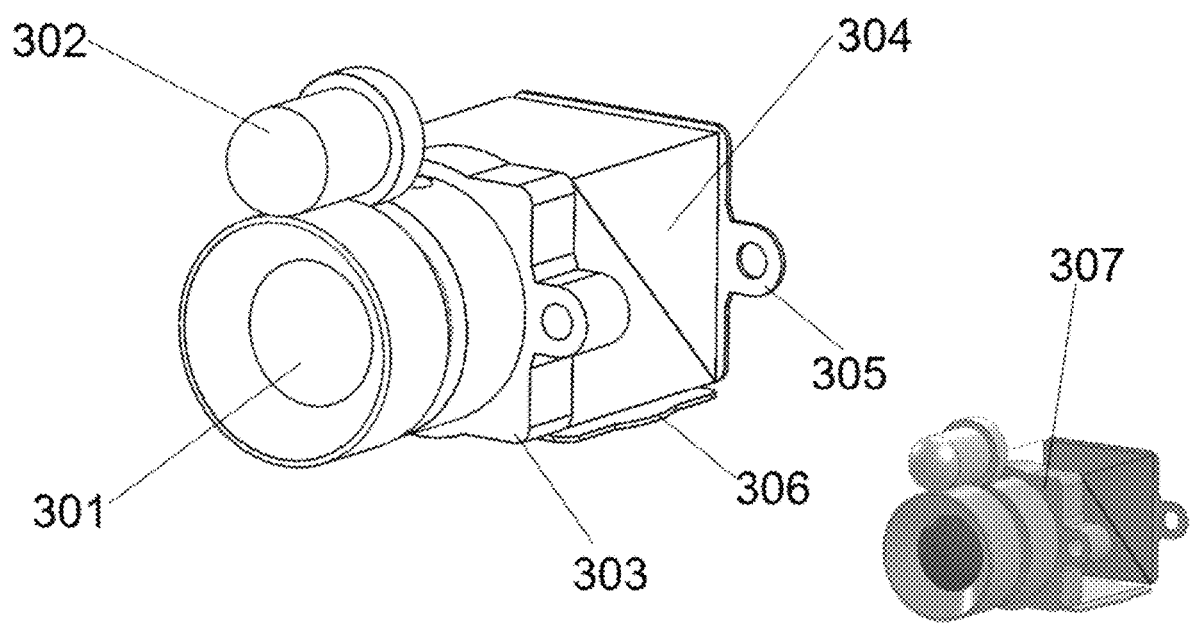
FIG. 3 is an eye projector and camera to be installed on smart eyeglasses' temples.

FIG. 3 describes a dual-purpose eye projector and camera for tracking direction of wearer's eyes. The input objective optics denoted as 301 will collect and project light to serve the user's needs. 302 is an LED generating light at the IR region, most probably 940 nm, both are mounted on a housing denoted as 303. A color separating Beamsplitter 304 will direct the IR content of an incoming beam towards a camera denoted as 306, while 305, an illuminated display miniature screen will project information through said 301 objective lenses towards the wearer's eyes. The projected image is polarized to facilitate reflection from wearer's lens. In case no eye tracker is required, then said LED 302 and camera 306 can be removed. It is easily understood for a person having ordinary skill in the art that this device can be replaced by a micro-projector preferable with laser beam scanning. 307 is a 3D rendered image.

Figure 4:
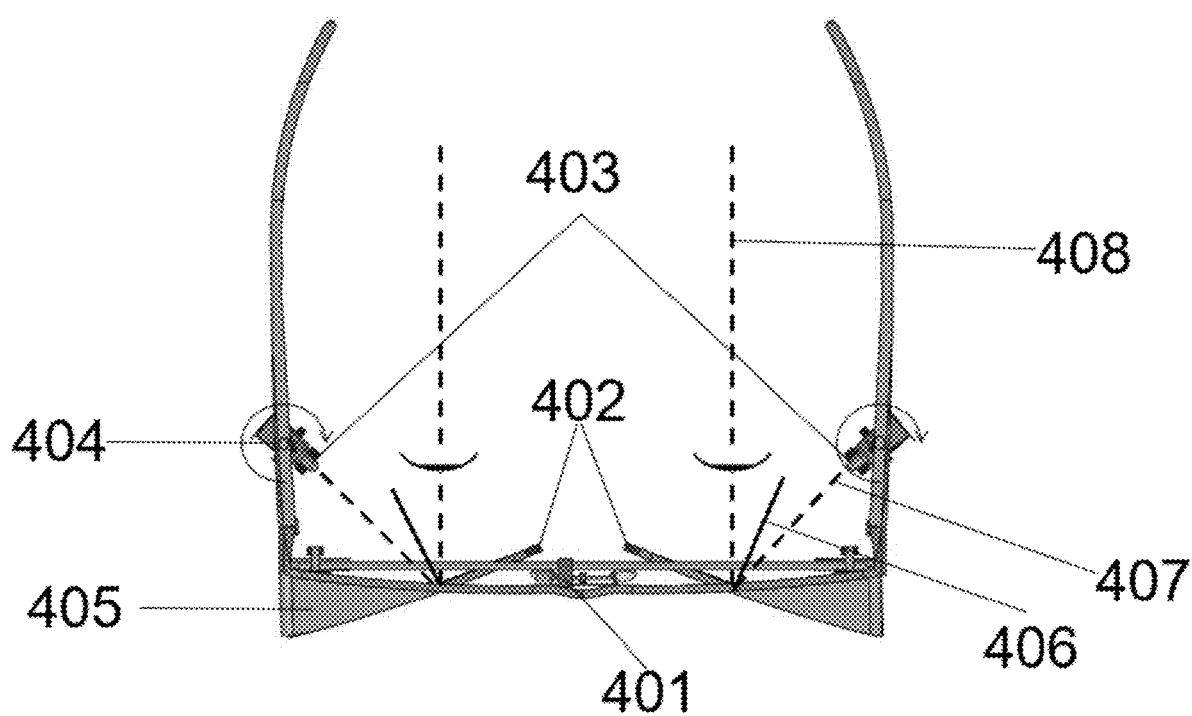
FIG. 4 is a schematic illustration of said smart eyeglasses, including 3D scanning cameras and eye projectors.

FIG. 4 is a fully equipped embodiment which includes the scanning camera device according to FIG. 2. The displayed projector and eye tracking device according to FIG. 3, and the oblique lenses, mounted to reflect the beam from projector display towards the wearer's eyes. A full activating cycle will allow tracking the eye movement, aiming the line of sight of cameras to coincide with wearer's line of sight. 401 denotes the said camera tracking device as disclosed in FIG. 2. 402 denotes the oblique mounted lenses which will reflect the image projected by the dual-purpose eye projector as disclosed in FIG. 3 and denoted as 403. Said lenses are preferable plain and will not affect the user eyesight quality—they're internally coated with a wire grid reflective polarizer which will reflect the projected image from said 403 projectors. The projected information is polarized according to the reflective polarizer in order to maximize the light signals received by wearer's eyes and propagating along the line of sight denoted as 408. External lens surface is preferable coated by a transparent coating for visible and reflective for IR to back reflect the IR illumination from said dual-purpose eye projector. 406 is a normal line to said lenses, which is inward-slanted towards the nose bridge, and the light projected from said 403 is reflected and denoted as 407, and follows the reflection law of the angle of incidence equals the angle of reflection. For full activation of the capability of smart eyeglasses, the said projected image from dual-purpose eye projector can rotate around 404 to track the user eye direction. 405 is the eyeglasses frame to meet the oblique direction of lenses and to provide extra eye shading.

Figure 5:
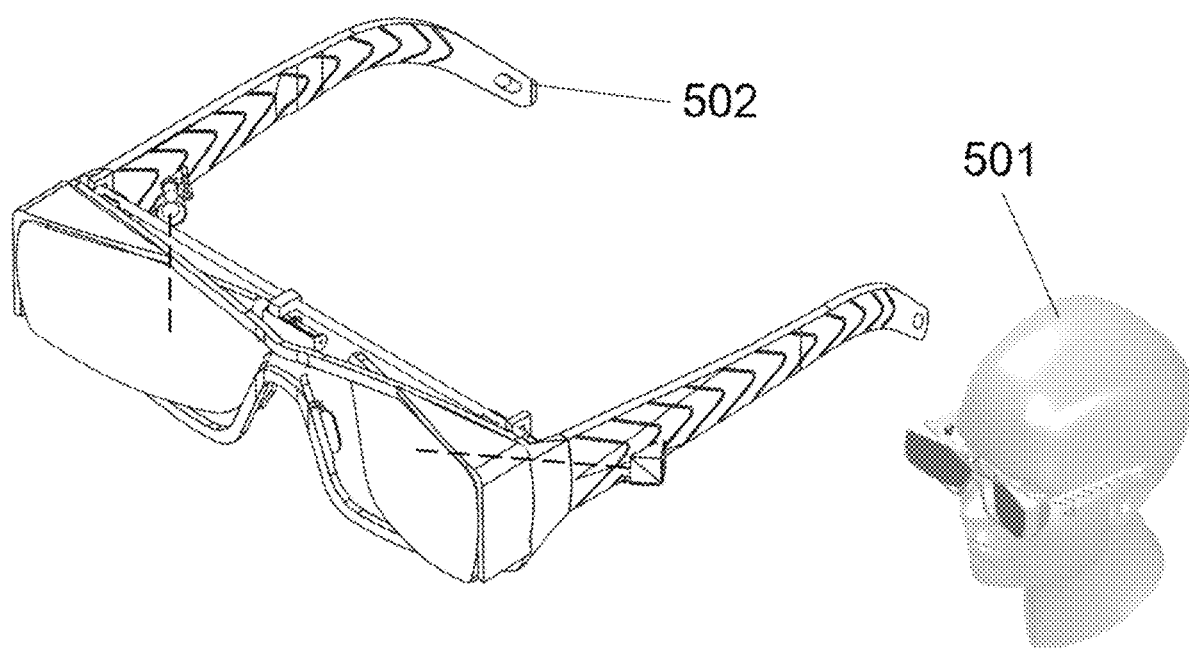
FIG. 5 is a perspective view of wearer and eyeglasses.

FIG. 5 is a perspective view of glasses, where 501 depicts the wearer and 502 shows the innovative art as disclosed in this application.

What is claimed is:

1. An apparatus comprising:
a spectacle frame with inward-slanting eyeglasses towards the nose bridge, configured to receive image and other radiations from a microdisplay eyepiece unit mounted on the temples, and reflecting from said lenses towards the wearer's eyes' central line of sight.

2. An apparatus according to claim 1, wherein said microdisplay eyepiece unit includes a microdisplay, a Beam-splitter and an illuminating IR source; said microdisplay unit is configured to emit the microdisplay image and illumination from an LED; and
back reflection from the wearer's eye is captured by an optical objective of said microdisplay, creating the wearer's eye image reflection.

3. An apparatus according to claim 1, wherein digital images to be projected to wearer's eyes are fed from a computer or a mobile phone.

4. An apparatus according to claim 1, wherein the processing device processes the reflected image into said eyepiece and calculates the direction of the wearer's gaze.

5. An apparatus comprising:
a pair of eyeglasses for the wearer, having two lenses on its frame corners and two cameras mounted on said lens image plane;
slanted lenses configured to receive images and other radiations from a microdisplay eyepiece unit, mounted on the temples and deflecting towards the eyes' central line of sight;
wherein said microdisplay unit is capable of being mounted on a motorized axis to track the wearer's gazing direction.

6. An apparatus according to claim 5, wherein said slanted lenses are wire grid polarizers reflecting S or P polarization and eyepiece radiation is polarized to be reflected by the lenses.

* * * * *